United States Patent
Bellert

(10) Patent No.: US 9,448,982 B2
(45) Date of Patent: Sep. 20, 2016

(54) IMMEDIATE INDEPENDENT RASTERIZATION

(71) Applicant: Konica Minolta Laboratory U.S.A., Inc., San Mateo, CA (US)

(72) Inventor: Darrell Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 155 days.

(21) Appl. No.: 14/167,836

(22) Filed: Jan. 29, 2014

(65) Prior Publication Data

US 2015/0212987 A1 Jul. 30, 2015

(51) Int. Cl.
*G06F 17/21* (2006.01)
*G06F 17/22* (2006.01)

(52) U.S. Cl.
CPC ......... *G06F 17/2247* (2013.01); *G06F 17/211* (2013.01)

(58) Field of Classification Search
None
See application file for complete search history.

(56) References Cited

U.S. PATENT DOCUMENTS

| | | | | |
|---|---|---|---|---|
| 9,305,381 B1* | 4/2016 | Walker | ............... | G06F 9/3802 |
| 2007/0296725 A1* | 12/2007 | Steiner | ............... | G06T 11/40 345/505 |
| 2009/0237697 A1* | 9/2009 | Caruso | ............... | G06F 3/1204 358/1.13 |
| 2009/0244622 A1* | 10/2009 | Maresch | ............... | G06K 15/02 358/1.16 |
| 2010/0079809 A1* | 4/2010 | Bellert | ............... | G06K 15/02 358/1.17 |
| 2011/0235105 A1* | 9/2011 | Ozawa | ............... | G06K 15/02 358/1.15 |
| 2012/0147387 A1* | 6/2012 | Morrison | ........... | G06K 15/1861 358/1.1 |
| 2013/0055072 A1* | 2/2013 | Arnold | ............... | G06T 15/503 715/240 |

OTHER PUBLICATIONS

Mileff, Dudra, Advanced 2D Rasterization on Modern CPUs, Oct. 1, 2013, Springer, pp. 63-79.*

* cited by examiner

*Primary Examiner* — Ahmad M El-Bkaily
(74) *Attorney, Agent, or Firm* — Osha Liang LLP

(57) ABSTRACT

A method for rendering an electronic document (ED) includes: receiving a request to render the ED; initiating, by a main process thread, generation of a main display list (DL) for the ED; identifying, during generation of the main DL, a first self-contained graphical structure (SCGS) within the ED; generating, by the main process thread, a first auxiliary DL for the first SCGS; inserting a reference to the first auxiliary DL into the main DL; initiating, after completion of the first auxiliary DL, rasterization of the first auxiliary DL by a first rasterization thread; resuming, by the main process thread and during rasterization of the first auxiliary DL, generation of the main DL; and rasterizing, after completion of the main DL, the main DL based on a first pixmap generated by rasterization of the first auxiliary DL.

20 Claims, 5 Drawing Sheets

IMMEDIATE INDEPENDENT RASTERIZATION

BACKGROUND

Computing devices are frequently used to render (e.g., display, print) electronic documents (EDs). However, rendering an ED is a non-trivial operation. Even in resource rich environments (e.g., multithread systems, large memory systems, etc.) throughput may be low if the rendering operation makes inefficient use of the available computing power. As EDs become more complex, users are always seeking to increase rendering throughput, especially when computing resources are available.

There have been attempts in the past to increase rasterization throughput. For example, one attempt involves partitioning a page of the ED into multiple bands, and then rasterizing the bands in parallel using different computer or arithmetic processing units/cores/threads. However, none of these attempts take into consideration the possible existence of self-contained graphical structures within the ED. Specifically, these past attempts do not intelligently exploit multiple threads in view of these self-contained graphical structures.

SUMMARY

In general, in one aspect, the invention relates to a method for rendering an electronic document (ED). The method comprises: receiving a request to render the ED; initiating, by a main process thread and in response to the request, generation of a main display list (DL) for the ED; identifying, during generation of the main DL, a first self-contained graphical structure within the ED; generating, by the main process thread, a first auxiliary DL for the first self-contained graphical structure; inserting a reference to the first auxiliary DL into the main DL; initiating, after completion of the first auxiliary DL, rasterization of the first auxiliary DL by a first rasterization thread; resuming, by the main process thread and during rasterization of the first auxiliary DL by the first rasterization thread, generation of the main DL; and rasterizing, after completion of the main DL, the main DL based on a first pixmap generated by rasterization of the first auxiliary DL.

In general, in one aspect, the invention relates to a non-transitory computer readable medium (CRM) storing instructions for rendering an electronic document (ED). The instructions comprise functionality for: receiving a request to render the ED; initiating, using a main process thread and in response to the request, generation of a main display list (DL) for the ED; identifying, during generation of the main DL, a first self-contained graphical structure within the ED; generating, using the main process thread, a first auxiliary DL for the first self-contained graphical structure; inserting a reference to the first auxiliary DL into the main DL; initiating, after completion of the first auxiliary DL, rasterization of the first auxiliary DL by a first rasterization thread; resuming, using the main process thread and during rasterization of the first auxiliary DL by the first rasterization thread, generation of the main DL; and rasterizing, after completion of the main DL, the main DL based on a first pixmap generated by rasterization of the first auxiliary DL.

In general, in one aspect, the invention relates to a system for rendering an electronic document (ED). The system comprises: a processor; a buffer configured to store the ED; a classifier executing on the processor and configured to identify a first self-contained graphical structure within the ED; a display list (DL) engine executing on the processor and configure to: generate a main DL for the ED; generate a first auxiliary DL for the first self-contained graphical structure; and insert a reference to the first auxiliary DL into the main DL; and a rasterization engine executing on the processor and configured to: generate a first pixmap by rasterizing the first auxiliary DL during generation of the main DL; and rasterize the main DL based on the first pixmap.

Other aspects of the invention will be apparent from the following description and the appended claims.

DETAILED DESCRIPTION

Figure 1:
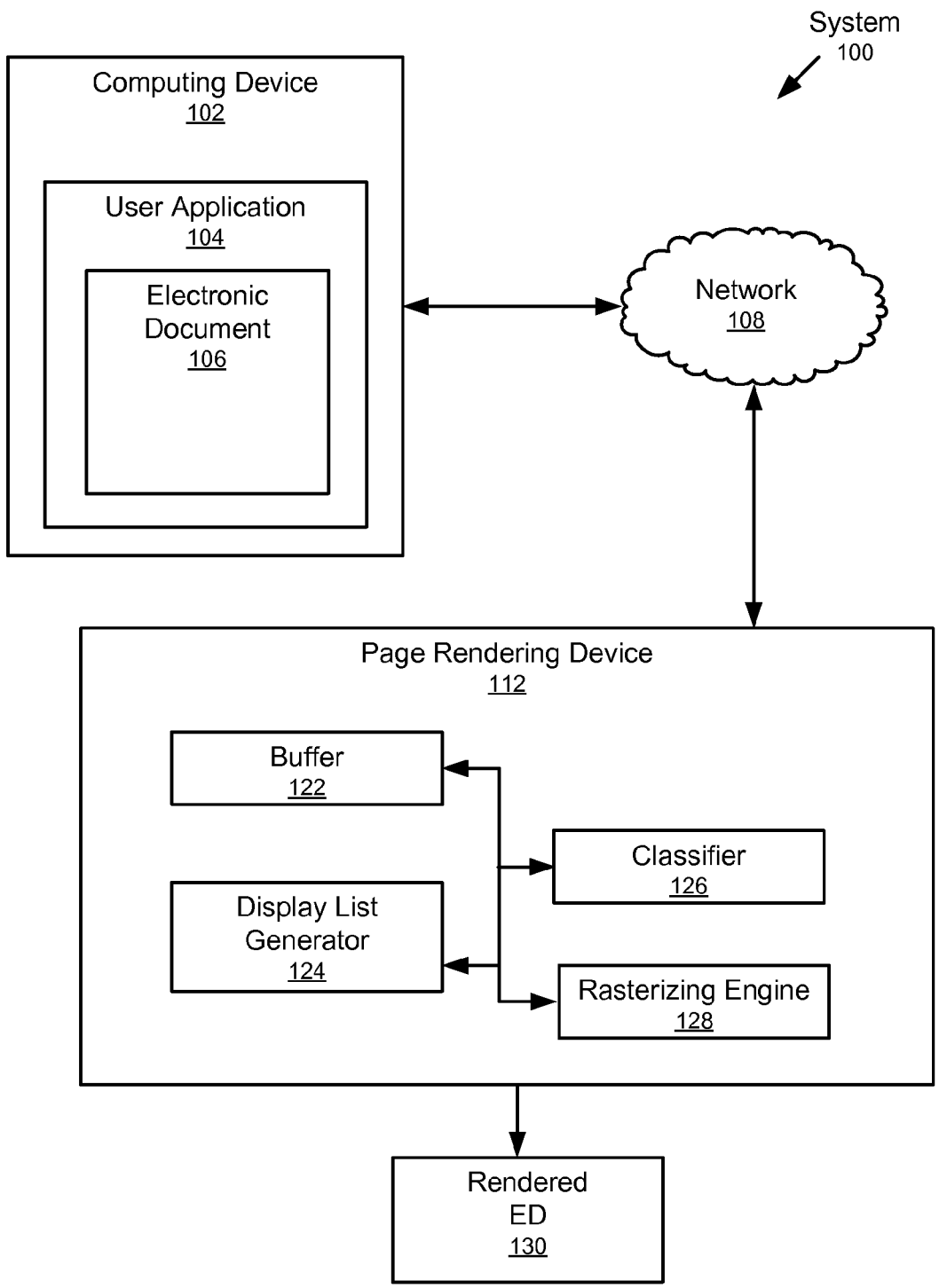
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for rendering an ED. Typically, operations in the ED are converted into drawing commands stored in a display list (DL). Subsequently, the DL may then be processed in order to generate a rendered version known as a pixmap. A self-contained graphical structure is an independent entity that does not depend on any other portion of the ED. The ED includes at least one self-contained graphical structure. In response to receiving a request to render the ED, generation of the main display list (DL) for the ED is started. An auxiliary DL for the self-contained graphical structure is generated and a reference to the auxiliary DL is inserted into the main DL. The completed auxiliary DL is rasterized while generation of the main DL resumes/continues in parallel. The pixmap created by rasterizing the auxiliary DL is used in the eventual rasterization of the main DL.

FIG. 1 shows a system (100) in accordance with one or more embodiments of the invention. As shown in FIG. 1, the system (100) has multiple components including a page rendering device (PRD) (112) and a computing device (102). The PRD (112) and/or the computing device (102) may be a personal computer (PC), a desktop computer, a mainframe, a server, a telephone, a kiosk, a cable box, a personal digital assistant (PDA), an electronic reader, a mobile phone, a smart phone, a tablet computer, etc. The PRD (112) and/or the computing device (102) may include a display device (e.g., a monitor, screen, etc.) for displaying an ED (discussed below). In one or more embodiments of the invention, there exists a direct connection (e.g., universal serial bus (USB)

connection) between the computing device (102) and the PRD (112). Alternatively, the computing device (102) and the PRD (112) may be connected using a network (108) having wired and/or wireless segments.

In one or more embodiments of the invention, the PRD (112) is located on the computing device (102). In such embodiments, the PRD (112) may correspond to any combination of hardware and software on the computing device (102) for rendering an ED.

In one or more embodiments of the invention, the computing device (102) executes the user application (104). The user application (104) is a software application operated by a user and configured to obtain, input, generate, display, and/or print an ED (e.g., Electronic Document (106)). Accordingly, the user application (104) may be a word-processing application, a spreadsheet application, a desktop publishing application, a graphics application, a photograph printing application, an Internet browser, a slide show generating application, a form, etc. The user application (104) may generate new EDs and/or obtain previously saved EDs.

In one or more embodiments of the invention, the ED (106) includes one or more graphical features. A graphical feature may correspond to a text character(s), a graphic, an image, etc. to be displayed on or across one or more pages. Furthermore, the ED (106) may include one or more self-contained graphical structures. A self-contained graphical structure is essentially content (i.e., a set of graphical features) that can be rasterized, independent of the main document image, as soon as it is fully described in display list. This independent and asynchronous rasterization is possible because the self-contained graphical structure does not interact with (is not dependent on) any other previous content in the ED. A self-contained graphical structure may include graphical features and even other self-contained graphical structures (i.e., the self-contained graphical structures may be nested). Examples of self-contained graphical structures include, but are not limited to, independent portable document format (PDF) groups, independent XML page specification (XPS) groups, XPS tiles, independent OFFICE OPEN XML (OOXML) groups, Personalized Print Markup Language (PPML) resources, images, and some high level OOXML objects like charts and shapes.

In one or more embodiments of the invention, the ED (106) is represented/defined using a document markup language (e.g., open document format (ODF), OOXML, etc.). Accordingly, the text characters, images, graphics, fonts, self-contained graphical structures, etc. in the ED (106) may be recorded/identified as attributes within the tags of the document markup language. Moreover, these text characters, images, graphics, fonts, self-contained graphical structures, etc. are needed to generate the rendered (i.e., displayed, printed) ED (130).

In one or more embodiments of the invention, the PRD (112) includes a buffer (122), a classifier (126), a DL generator (124), and a rasterizing engine (128). Each of these components (122, 124, 126, 128) is discussed below.

In one or more embodiments of the invention, the PRD (112) includes the buffer (122). The buffer (122) may correspond to any type of memory or long-term storage (e.g., hard drive). The buffer (122) is configured to store the ED (106) obtained by the PRD (112).

In one or more embodiments of the invention, the PRD (112) includes the classifier (126). The classifier (126) is configured to identify self-contained graphical structures within the ED (106). The identification may take place, for example, during a parsing of the ED (106).

In one or more embodiments of the invention, the classifier (126) includes a pre-wired or pre-programmed data structure (e.g., list) storing the identities of self-contained graphical structures. The classifier (126) may compare any content encountered within the ED (106) with the identities in the data structure. If there is a match, the content is identified as a self-contained graphical structure.

In one or more embodiments of the invention, classifier (126) is configured to analyze each object/attribute of a graphical feature and determine if the object/attribute interacts with or depends on previous content in the ED. If none of the objects/attributes interact with or depend on previous content in the ED, then the graphical feature may be added to a self-contained graphical structure. In other words, graphical features that do not have objects/attributes that depend on previous content in the ED may be grouped to form one or more self-contained graphical structures.

In one or more embodiments of the invention, the PRD (112) includes the DL generator (124). The DL generator (124) is configured to generate a main DL for the ED (106) and an auxiliary DL for each identified self-contained graphical structure. Generation of the main DL may begin in response to a request to render the ED (106). Generation of an auxiliary DL may begin in response to identifying a self-contained graphical structure. In one or more embodiments of the invention, generation of an auxiliary DL begins after generation of the main DL. Moreover, generation of the auxiliary DL may finish before generation of the main DL is finished.

In one or more embodiments of the invention, the auxiliary DL includes one or more entries for each graphical feature in the self-contained graphical structure. Similarly, the main DL includes one or more entries for each graphical feature specified in the ED (106). The entries in the main DL and the auxiliary DL store simple instructions, elemental vector objects (e.g., as triangles or trapezoids), vector outlines of text characters, etc. needed to render the graphical features. Further, the DL generator (124) is configured to insert a reference in an auxiliary DL to the auxiliary DL of a nested self-contained graphical structure (discussed below). Further still, the DL generator (124) is also configured to insert a reference in the main DL to the auxiliary DL of a non-nested self-contained graphical structure (discussed below).

In one or more embodiments of the invention, the PRD (112) includes the rasterizing engine (128). The rasterizing engine (128) is configured to rasterize the main DL and the one or more auxiliary DLs generated by the DL generator (124). In other words, the rasterizing engine (128) is configured to generate pixmaps from the main DL and the auxiliary DL(s). As discussed above, the auxiliary DLs correspond to self-contained graphical structures. Accordingly, rasterization of the auxiliary DLs are initiated and possibly even completed before the generation of the main DL is completed. The pixmap resulting from the rasterization of an auxiliary DL may be used in the rasterization of the main DL and/or the rasterization of another auxiliary DL having a reference to the now rasterized auxiliary DL.

In one or more embodiments of the invention, the main DL and the auxiliary DLs are generated by a main process thread. Once an auxiliary DL is completed, the main process thread may transfer the auxiliary DL to a rasterizing thread. The main process thread may continue/resume generating the main DL or another auxiliary DL while the rasterizing thread rasterizes the completed auxiliary DL. In other words, generation of the main/auxiliary DL takes place in parallel with rasterization of the completed auxiliary DL. This effectively increases rasterization throughput.

Figure 2:
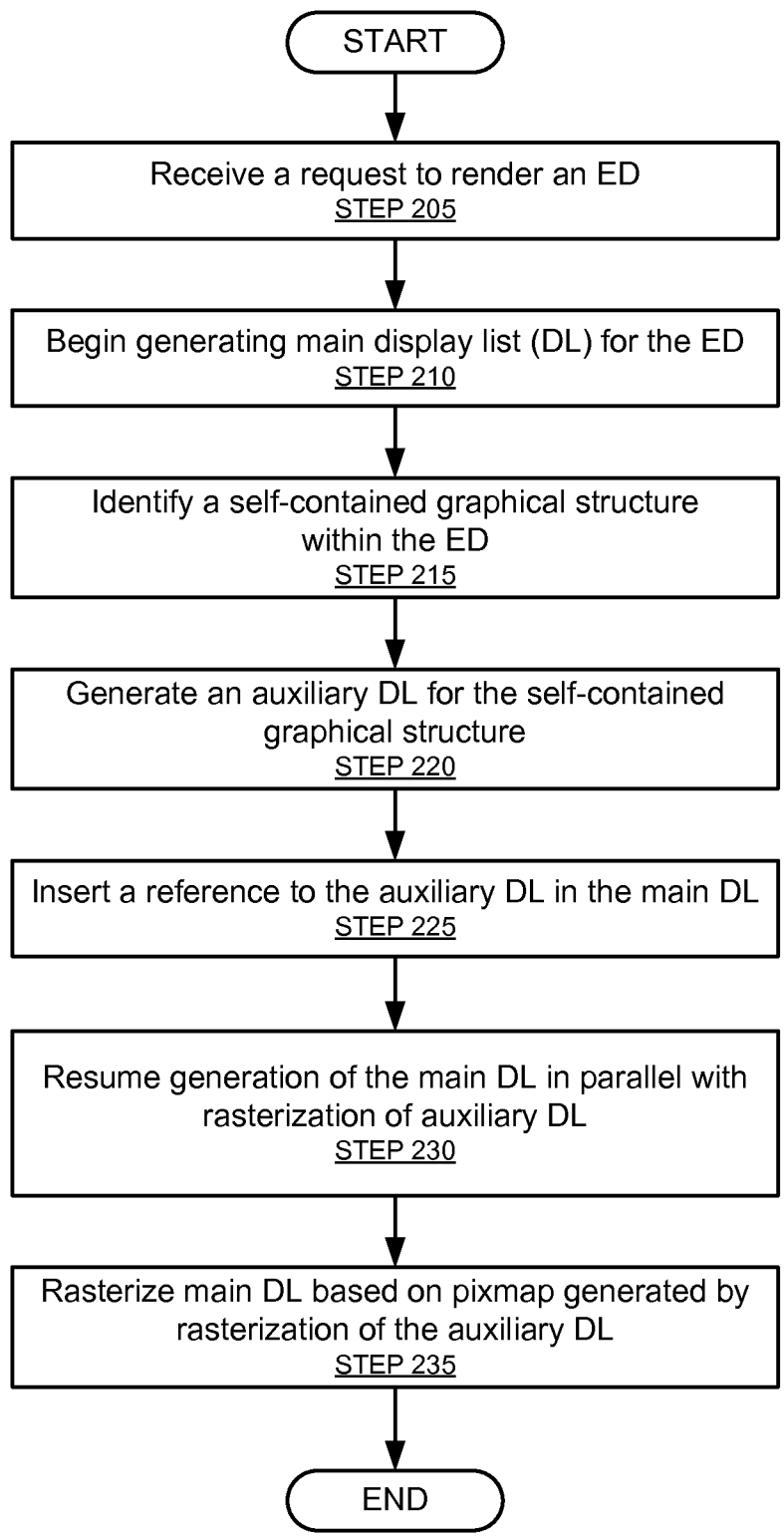
FIG. 2 shows a flowchart in accordance with one or more embodiments of the invention.

FIG. 2 shows a flowchart in accordance with one or more embodiments of the invention. The process shown in FIG. 2 may be executed, for example, by one or more components (e.g., classifier (126), display list generator (124), rasterizing engine (128)) discussed above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, a request to render an ED is received (STEP 205). The request may be received from a user and/or user application. The ED includes one or more graphical features. A graphical feature may correspond to a text character(s), a graphic, image, etc. to be displayed on or across one or more pages. Furthermore, the ED may include one or more self-contained graphical structures. As discussed above, a self-contained graphical structure is essentially content (i.e., a set of graphical features) that can be rasterized, independent of the main document image, as soon as it is fully described in DL.

In STEP 210, generation of a main DL for the ED begins. Specifically, the ED is parsed and one or more graphical features are encountered. The main DL is populated with simple instructions, elemental vector objects (e.g., as triangles or trapezoids), vector outlines of text characters, etc. needed to render these graphical features. Generation of the main DL may be executed by a main process thread.

In STEP 215, a self-contained graphical structure is identified within the ED. In one or more embodiments of the invention, the self-contained graphical structure may be identified by comparing content encountered in the ED with a pre-wired or pre-programmed list of self-contained graphical structures. In one or more embodiments of the invention, identifying a self-contained graphical structure includes determining that one or more graphical features in the ED do not have any objects/attributes that interact with or depend on previous content in the ED. These graphical features are grouped to form one or more self-contained graphical structures.

In STEP 220, an auxiliary DL is generated for the self-contained graphical structure. In one or more embodiments of the invention, the main process thread temporarily suspends building the main DL and builds the auxiliary DL. As discussed above, a self-contained graphical structure includes a set of graphical features. Accordingly, the auxiliary DL is populated with simple instructions, elemental vector objects (e.g., as triangles or trapezoids), vector outlines of text characters, etc. needed to render these graphical features in the self-contained graphical structure.

In STEP 225, a reference to the auxiliary DL is inserted into the main DL. Once the auxiliary DL is completed, the main process thread may transfer the auxiliary DL to a rasterization thread for immediate rasterization.

In STEP 230, generation of the main DL is resumed in parallel with rasterization of the auxiliary DL. In other words, rasterization of the auxiliary DL can begin before generation of the main DL is complete. Those skilled in the art, having the benefit of this detailed description, will appreciate that this immediate/asynchronous rasterization of the auxiliary DL increases rasterization throughput.

In STEP 235, once rasterization of the auxiliary DL is complete, rasterization of the main DL can begin. The output of the rasterization of the auxiliary DL is a pixmap needed to successfully rasterize the main DL. The output of the rasterization of the main DL is also a pixmap to render (display or print) the ED.

Although the process in FIG. 2 mentions only one self-contained graphical structure, the ED may have multiple self-contained graphical structures. Accordingly, an auxiliary DL may be generated for each of these self-contained graphical structures, and these multiple auxiliary DLs may be rasterized in parallel with the resumed/continued generation of the main DL.

As discussed above, self-contained graphical structures may be nested within other self-contained graphical structures. In such scenarios, an auxiliary DL is generated for the nested self-contained graphical structure and a reference to this auxiliary DL is inserted into the auxiliary DL for the non-nested self-contained graphical structure. Once generation of the auxiliary DL for the nested self-contained graphical structure is complete, the main process thread may transfer this auxiliary DL to a rasterization thread for immediate rasterization and resume generating the non-nested auxiliary DL.

Figure 3:
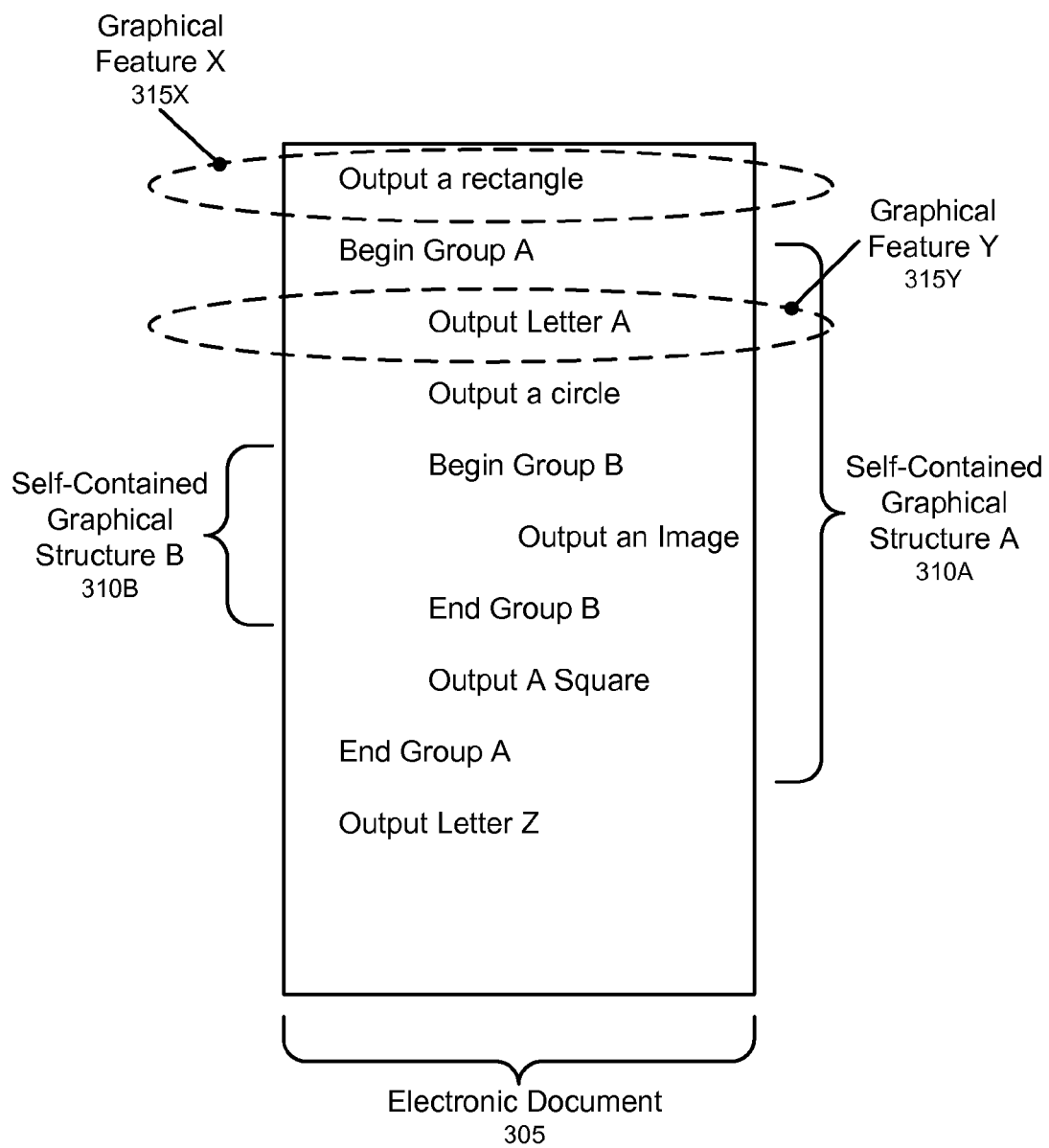
FIGS. 3 and 4 show an example in accordance with one or more embodiments of the invention.
Figure 4:
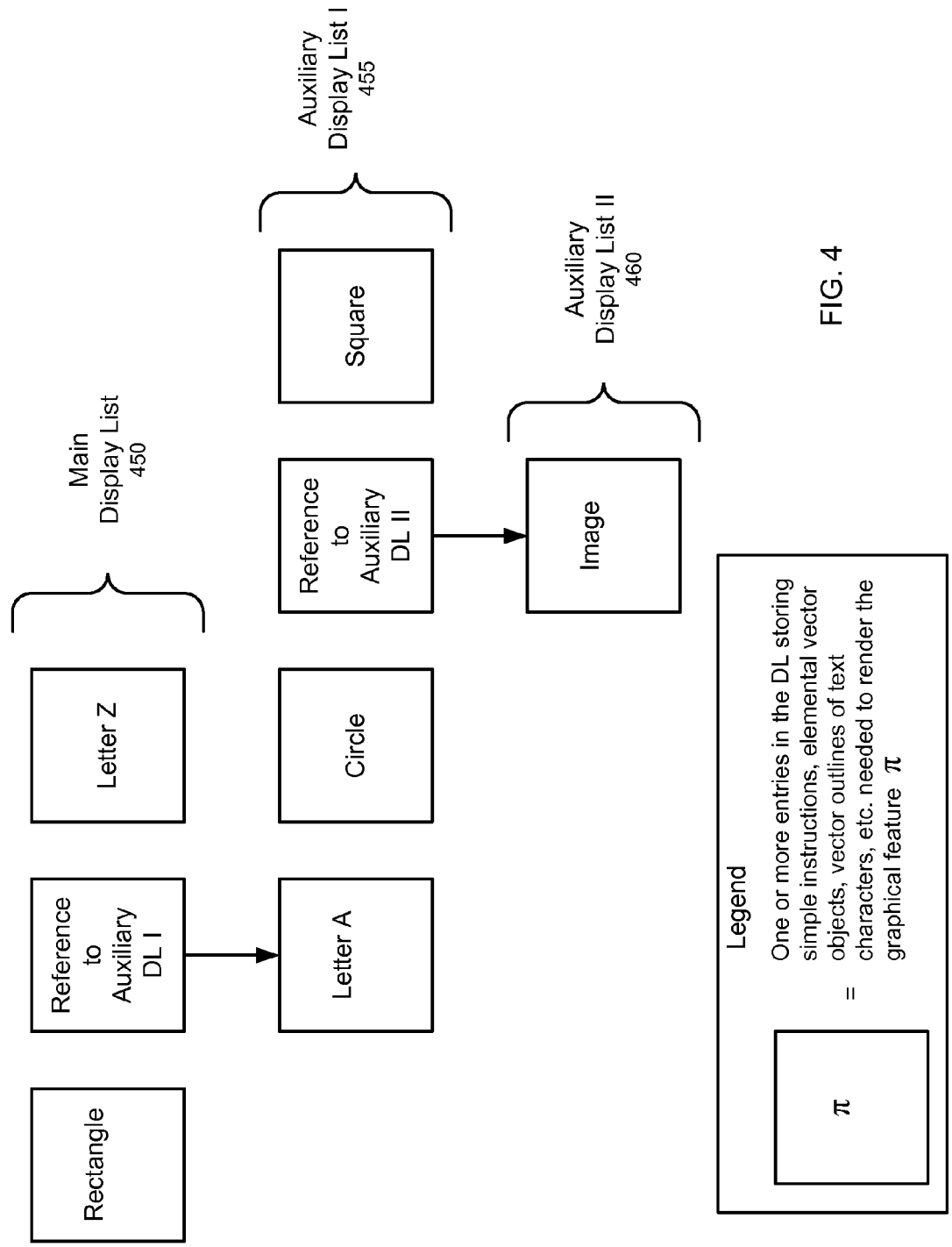

FIG. 3 and FIG. 4 show an example in accordance with one or more embodiments of the invention. Assume a request has been received to render the ED (305). The ED (305) includes multiple graphical features (e.g., Graphical Feature X (315X), Graphical Feature Y (315Y)) and multiple correctly identified self-contained graphical structures (Self-Contained Graphical Structure A (310A) and Self-Contained Graphical Structure B (310B)). Self-contained graphical structure B (310B) is nested within self-contained graphical structure A (310A). Moreover, graphical feature Y (315Y) is a component of self-contained graphical structure A (310A).

FIG. 4 shows three DLs: main DL (450) corresponding to the ED (305), auxiliary DL I (455) corresponding to self-contained graphical structure A (310A), and auxiliary DL II (460) corresponding to self-contained graphical structure B (310B). In response to the request to render the ED (305), the main process thread begins generating the main DL (450). Upon identifying self-contained graphical structure A (310A) in the ED (305), the main process thread begins to generate auxiliary DL I (455) and inserts a reference to auxiliary DL I (455) into the main DL (450). Generation of auxiliary DL I (455) continues until the main process thread identifies self-contained graphical structure B (310B) in the ED (305). Then, the main process thread begins to generate auxiliary DL II (460) and inserts a reference to auxiliary DL II (460) into auxiliary DL I (455).

Once auxiliary DL II (460) is complete, the main process thread transfers auxiliary DL II (460) to a rasterization thread for immediate rasterization. The main process thread resumes generating auxiliary DL I (455) while auxiliary DL II (460) is rasterized in parallel. Once auxiliary DL I (455) is complete, the main process thread transfers auxiliary DL I (455) to a rasterization thread for immediate rasterization. Rasterization of auxiliary DL I (455) requires the pixmap generated by the rasterization of auxiliary DL II (460). The main process thread resumes generating main DL (450) while auxiliary DL I (455) is rasterized in parallel. Once the main DL (450) is complete, it too is rasterized. Rasterization of the main DL (450) requires the pixmap generate by rasterization of auxiliary DL I (455).

Embodiments of the invention may have one or more of the following advantages: the ability to rasterize self-contained graphical structures before the main DL for the ED is complete; the ability to increase rasterization throughput; the ability to rasterize nested self-contained graphical structures using multiple auxiliary DLs; the ability to use the pixmap generated from rasterizing an auxiliary DL by inserting a reference to the auxiliary DL in the main DL; etc.

Figure 5:
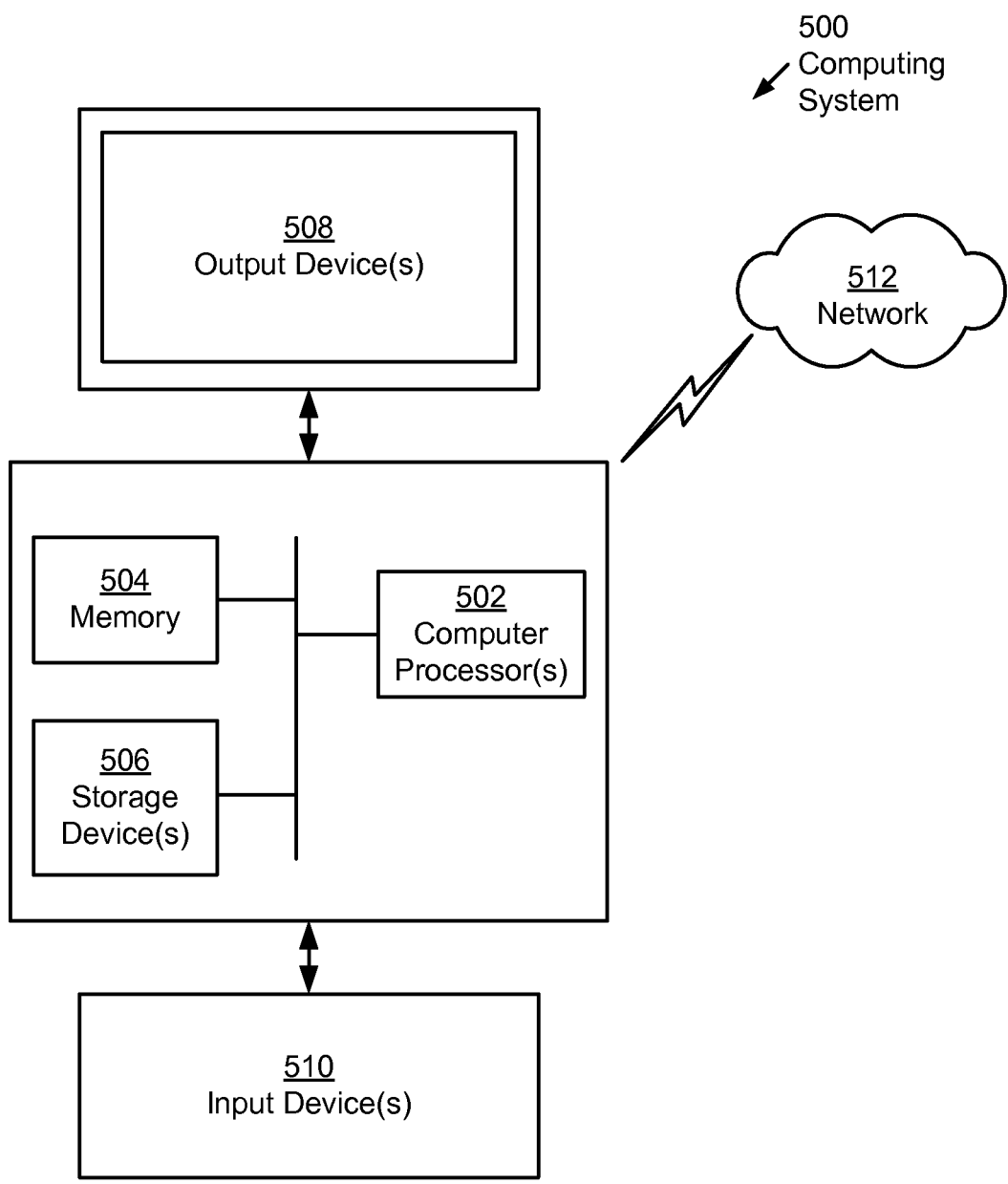
FIG. 5 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for rendering an electronic document (ED), comprising:
   receiving a request to render the ED comprising a first self-contained graphical structure and a first graphical feature external to the first self-contained graphical structure;
   initiating, by a main process thread and in response to the request, generation of a main display list (DL) for the ED, the main DL comprising a plurality of entries populated with a plurality of instructions needed to render the first graphical feature;
   identifying, during generation of the main DL, the first self-contained graphical structure comprising a second graphical feature within the ED;
   generating, by the main process thread, a first auxiliary DL for the first self-contained graphical structure, the first auxiliary DL comprising a plurality of entries populated with a plurality of elemental vector objects needed to render the second graphical feature;
   inserting a reference to the first auxiliary DL into the main DL;
   initiating, after completion of the first auxiliary DL, rasterization of the first auxiliary DL by a first rasterization thread;
   resuming, by the main process thread and during rasterization of the first auxiliary DL by the first rasterization thread, generation of the main DL; and
   rasterizing, after completion of the main DL, the main DL based on a first pixmap generated by rasterization of the first auxiliary DL.

2. The method of claim 1, further comprising:
   identifying, during generation of the first auxiliary DL, a second self-contained graphical structure comprising a third graphical feature;
   generating, by the main process thread, a second auxiliary DL for the second self-contained graphical structure;
   inserting a reference to the second auxiliary DL into the first auxiliary DL;
   initiating, after completion of the second auxiliary DL, rasterization of the second auxiliary DL by a second rasterization thread; and
   resuming, by the main process thread and during rasterization of the second auxiliary DL by the second rasterization thread, generation of the first auxiliary DL,
   wherein rasterization of the first auxiliary DL is based on a second pixmap generated by rasterization of the second auxiliary DL.

3. The method of claim 2, wherein generating the second auxiliary DL comprises:
   populating the second auxiliary DL with a plurality of elemental vector objects needed to render the third graphical feature.

4. The method of claim 1, further comprising:
   identifying, during generation of the main DL, a second self-contained graphical structure within the ED;
   generating, by the main process thread, a second auxiliary DL for the second self-contained graphical structure;

inserting a reference to the second auxiliary DL into the main DL;

initiating, after completion of the second auxiliary DL, rasterization of the second auxiliary DL by a second rasterization thread; and resuming, by the main process thread and during rasterization of the second auxiliary DL by the second rasterization thread, generation of the main DL, wherein rasterizing the main DL is further based on a second pixmap generated by rasterization of the second auxiliary DL.

5. The method of claim 1, wherein identifying the first self-contained graphical structure comprises:

accessing a list of self-contained graphical structures, wherein the list exists before the request to render the ED is received; and comparing content of the ED with the list.

6. The method of claim 1, wherein identifying the first self-contained graphical structure comprises:

determining that a plurality of graphical features in the ED do not comprise at least one selected from a group consisting of an attribute and an operation that depends on previous content in the ED; and grouping the plurality of graphical features to form the first self-contained graphical structure.

7. The method of claim 1, wherein the first self-contained graphical structure is one selected from a group consisting of an independent portable document format (PDF) group, an independent XML paper specification (XPS) group, and an independent OFFICE OPEN XML (OOXML) group.

8. The method of claim 1, wherein the first self-contained graphical structure is selected from a group consisting of an XML paper specification (XPS) tile and a Personalized Print Markup Language (PPML) resource.

9. A non-transitory computer readable medium (CRM) storing instructions for rendering an electronic document (ED), the instructions comprising functionality for:

receiving a request to render the ED comprising a first self-contained graphical structure and a first graphical feature external to the first self-contained graphical structure;

initiating, using a main process thread and in response to the request, generation of a main display list (DL) for the ED, the main DL comprising a plurality of entries populated with a plurality of instructions needed to render the first graphical feature;

identifying, during generation of the main DL, the first self-contained graphical structure comprising a second graphical feature within the ED;

generating, using the main process thread, a first auxiliary DL for the first self-contained graphical structure, the first auxiliary DL comprising a plurality of entries populated with a plurality of elemental vector objects needed to render the second graphical feature;

inserting a reference to the first auxiliary DL into the main DL;

initiating, after completion of the first auxiliary DL, rasterization of the first auxiliary DL by a first rasterization thread;

resuming, using the main process thread and during rasterization of the first auxiliary DL by the first rasterization thread, generation of the main DL; and rasterizing, after completion of the main DL, the main DL based on a first pixmap generated by rasterization of the first auxiliary DL.

10. The non-transitory CRM of claim 9, the instructions further comprising functionality for:

identifying, during generation of the first auxiliary DL, a second self-contained graphical structure comprising a third graphical feature;

generating, using the main process thread, a second auxiliary DL for the second self-contained graphical structure;

inserting a reference to the second auxiliary DL into the first auxiliary DL;

initiating, after completion of the second auxiliary DL, rasterization of the second auxiliary DL by a second rasterization thread; and resuming, using the main process thread and during rasterization of the second auxiliary DL by the second rasterization thread, generation of the first auxiliary DL, wherein rasterization of the first auxiliary DL is based on a second pixmap generated by rasterization of the second auxiliary DL.

11. The non-transitory CRM of claim 10, wherein the instructions for generating the second auxiliary DL comprise functionality for:

populating the second auxiliary DL with a plurality of elemental vector objects needed to render the third graphical feature.

12. The non-transitory CRM of claim 9, the instructions further comprising functionality for:

identifying, during generation of the main DL, a second self-contained graphical structure within the ED;

generating, using the main process thread, a second auxiliary DL for the second self-contained graphical structure;

inserting a reference to the second auxiliary DL into the main DL;

initiating, after completion of the second auxiliary DL, rasterization of the second auxiliary DL by a second rasterization thread; and resuming, by the main process thread and during rasterization of the second auxiliary DL by the second rasterization thread, generation of the main DL, wherein rasterizing the main DL is further based on a second pixmap generated by rasterization of the second auxiliary DL.

13. The non-transitory CRM of claim 9, wherein the instructions for identifying the first self-contained graphical structure comprise functionality for:

accessing a list of self-contained graphical structures, wherein the list exists before the request to render the ED is received; and comparing content of the ED with the list.

14. The non-transitory CRM of claim 9, wherein the instructions for identifying the first self-contained graphical structure comprise functionality for:

determining that a plurality of graphical features in the ED do not comprise at least one selected from a group consisting of an attribute and an operation that depends on previous content in the ED; and grouping the plurality of graphical features to form the first self-contained graphical structure.

15. A system for rendering an electronic document (ED) comprising a first graphical feature, comprising:

a processor;

a buffer configured to store the ED;

a classifier executing on the processor and configured to identify a first self-contained graphical structure comprising a second graphical feature within the ED, wherein the first graphical feature is external to the first self-contained graphical structure within the ED;

a display list (DL) engine executing on the processor and configure to:
  generate, using a main thread, a main DL for the ED by populating a plurality of entries in the main DL with a plurality of instructions needed to render the first graphical feature;
  generate, using the main thread, a first auxiliary DL for the first self-contained graphical structure by populating a plurality of entries in the first auxiliary DL with a plurality of elemental vector objects needed to render the second graphical feature,
    wherein generation of the main DL is paused to generate the first auxiliary DL after the first self-contained graphical structure is identified, and
    wherein generation of the main DL is resumed after the first auxiliary DL is generated; and
  insert a reference to the first auxiliary DL into the main DL; and
a rasterization engine executing on the processor and configured to:
  generate a first pixmap by rasterizing the first auxiliary DL using a first rasterizing thread during generation of the main DL; and
  rasterize the main DL based on the first pixmap.

16. The system of claim 15, wherein:
the DL engine is further configured to:
  generate, using the main thread, a second auxiliary DL for a second self-contained graphical structure within the first self-contained graphical structure, the second self-contained graphical structure comprising a third graphical feature; and
  insert a reference to the second auxiliary DL into the first auxiliary DL; and
the rasterization engine is further configured to:
  generate a second pixmap by rasterizing the second auxiliary DL using a second rasterizing thread during generation of the first auxiliary DL,
  wherein the first auxiliary DL is rasterized based on the second pixmap.

17. The system of claim 15, wherein the classifier comprises:
a list identifying a plurality of self-contained graphical structures.

18. The system of claim 15, wherein the first self-contained graphical structure is one selected from a group consisting of an independent portable document format (PDF) group, an independent XML paper specification (XPS) group, and an independent OFFICE OPEN XML (OOXML) group.

19. The system of claim 15, wherein the first self-contained graphical structure is selected from a group consisting of an XML paper specification (XPS) tile and a Personalized Print Markup Language (PPML) resource.

20. The system of claim 16, wherein the second auxiliary DL comprises a plurality of elemental vector objects needed to render the third graphical feature.

* * * * *